United States Patent [19]

Galperin

[11] Patent Number: 5,069,592

[45] Date of Patent: Dec. 3, 1991

[54] AUTOMATED MULTISTOREY PARKING BUILDING

[76] Inventor: Lev Galperin, 4950 St. Kevin, #18, Montreal, Canada, H3W 1P4

[21] Appl. No.: 492,115

[22] Filed: Mar. 13, 1990

[51] Int. Cl.[5] .............................................. E04H 6/12
[52] U.S. Cl. .................................................... 414/240
[58] Field of Search ............... 414/233, 234, 239, 240, 414/241, 245, 255, 256, 260, 262, 264, 279, 286

[56] References Cited

U.S. PATENT DOCUMENTS

| | | | |
|---|---|---|---|
| 2,857,060 | 10/1958 | Carroll | 414/260 |
| 2,904,200 | 9/1959 | Diehl | 414/255 X |
| 3,217,905 | 11/1965 | Frangos | 414/239 |
| 3,583,584 | 6/1971 | Iacco | 414/279 |
| 3,680,718 | 8/1972 | Miyachi | 414/239 |
| 3,737,057 | 6/1973 | Neumann et al. | 414/239 X |
| 4,968,208 | 11/1990 | Friberg | 414/256 |

*Primary Examiner*—David A. Bucci

[57] ABSTRACT

A multistorey parking apparatus comprising a multistorey parking building with appropriate partitioning, fixing and moving elements characterized in that the said apparatus is capable of automatically, safely and pollution free taking in, distributing and storing motor vehicles in the parking building and delivering them out on demand without drivers and without running the engine.

1 Claim, 7 Drawing Sheets

AUTOMATED MULTISTOREY PARKING BUILDING

FIELD OF THE INVENTION

The present invention relates generally to structures for a multistorey parking building or parking attachment to an existing building and to devices for automated parking and, more particularly, to structures made of modular elements and to devices and platforms for automatic car distribution within a multistorey parking space.

BACKGROUND OF THE INVENTION

At present time, parking spaces are in the form of open paved squares, basement storeys of buildings or as separate concrete structures where vehicle is being parked by its driver (or valet parking). Open parking spaces occupy significant areas of already crowded cities. Multistorey concrete parking buildings with human parking (by driver or valet) are bulky, relatively expensive and ineffective since the area and the height are only partially used for vehicle placement so that the volume of a parking building is used up to 35% only. When most parking spaces are occupied, the arriving vehicles are manoeuvring or waiting with running engine which leads to increased pollution. This invention aims at solving parking problems in downtowns of big cities, at aeroports, theatres, shopping malls, stadiums and universities; at elimination of street parking in crowded areas, at decreasing pollution and at providing clean, safe, inexpensive and fast automated parking spaces.

Preliminary search did not find any patents proposing structures and devices for automated multistorey parking buildings.

SUMMARY OF THE INVENTION

The object of the invention is the structure of the multistorey parking building and the devices providing automatic operation at all stages of parking process. The parking building of the parking attachment to an existing building is manufactured as a steel frame in such a way that the volume of the structure is partitioned into boxes in which vehicles are stationed, and horizontal lanes (corridors) and vertical lanes (with elevators) where devices (shuttles or trolleys) are moving that distribute vehicles into boxes. Due to different sizes of vehicles, there may be several different types of boxes which provides for better use of the volume of the parking building. Every box has a platform on which to park a vehicle. Platforms with or without vehicles can be moved through the building by shuttles moving on special guides which serve simultaneously as supporting structure of the building. For better ventilation, boxes are separated vertically by grid desk plating or solid floors with holes. Walls of the underground part of the parking building are made of concrete and the upper part can be made with any appropriate materials, with or without windows. Vertical transportation of shuttles or trolleys is provided by special elevators with guides. Guides in elevators and guides in horizontal corridors are aligned when elevators stop. Every platform has two guides tracks and the mechanism to precisely check and fix the vehicle on the platform.

The automatic parking process is as follows. At the entrance, a driver puts his vehicle on the platform set on a shuttle which awaits customers, leaves the vehicle and pays the fee to the automatic parking-dispenser which immediately gives the driver a code-number and directs the shuttle with the vehicle to the vacant box with that code-number. The driver leaves the premises. Upon arrival to the box, the platform with the car is moved from the shuttle into the box, the vacant shuttle is directed to a vacant box with the platform but without a vehicle, the platform is transferred onto the shuttle which returns to the entrance to wait for another customer. There are several shuttles in the building; among them there is a vacant shuttle for vehicle delivery and another one with a platform to take a vehicle for parking. If the parking is full, then the shuttles stand still where they are until a driver arrives to pick up his vehicle. The driver dials his code-number and pays the balance to the parking-dispenser; then the closest shuttle is directed to the box, makes delivery of the vehicle and awaits another customer. All operations are automatic and computerized including the inventory of vacant and occupied boxes, control of shuttles and elevators and additional services, if any (e.g., automatic car wash). In case of equipment failure, a technician on duty delivers a vehicle by manual operations.

NOTE: Shuttles are devices which distribute platforms with or without vehicles into or out of the boxes and are circulating in lanes (corridors) and on elevetors. Trolleys represent moving platforms that are normally stationed in boxes (with or without vehicles) and are circulating in lanes (corridors) and on elevators in order to deliver a vehicle parked on a trolley into a box for storage and to take it out of the box to the exit on request of the driver of the vehicle.

DETAILED DESCRIPTION OF THE PREFERRED EMBODIMENTS

Figure 1:
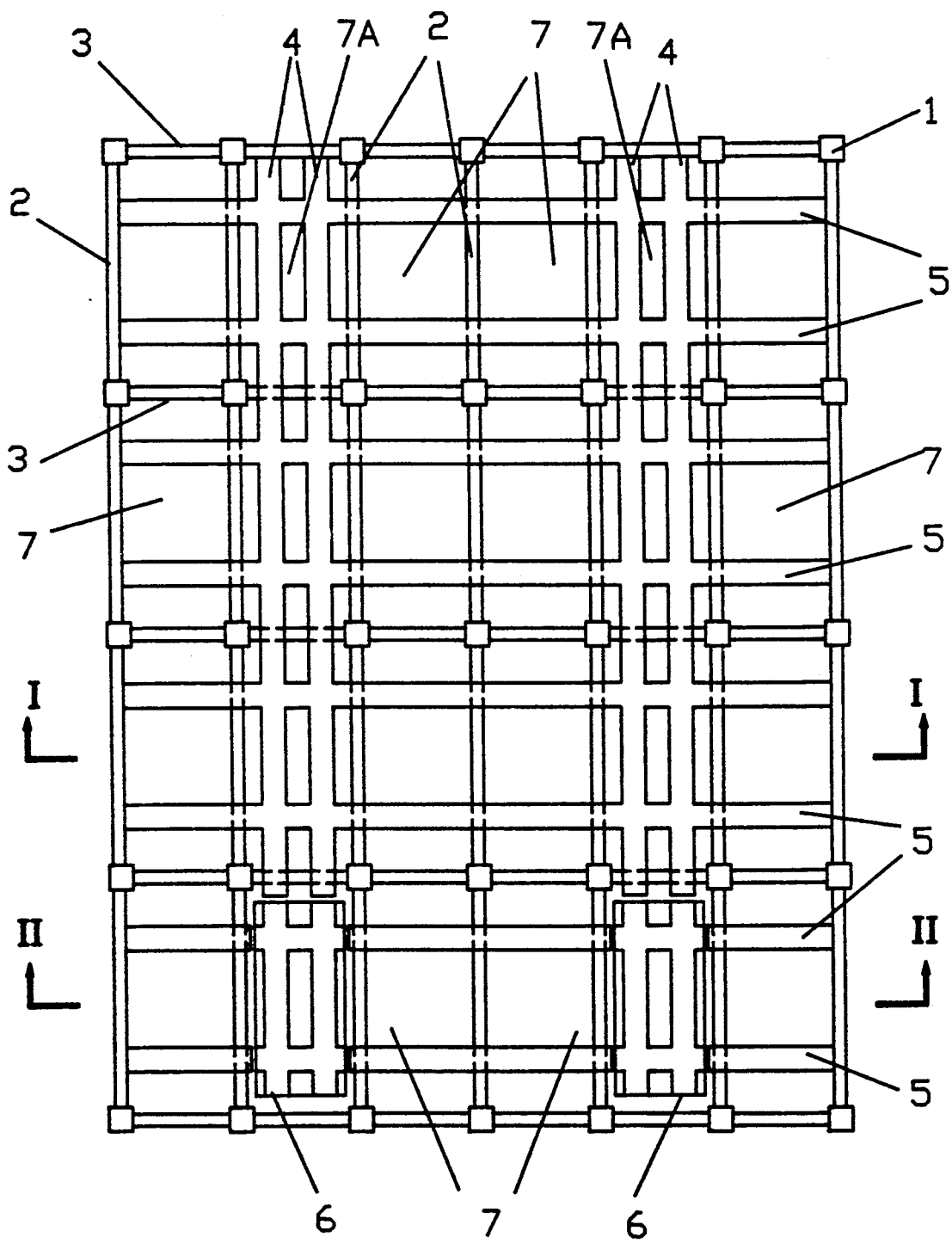
FIG. 1 is a plan view of the automated multistory parking according to the embodiment of the present invention claimed in claim 6 below.
Figure 2:
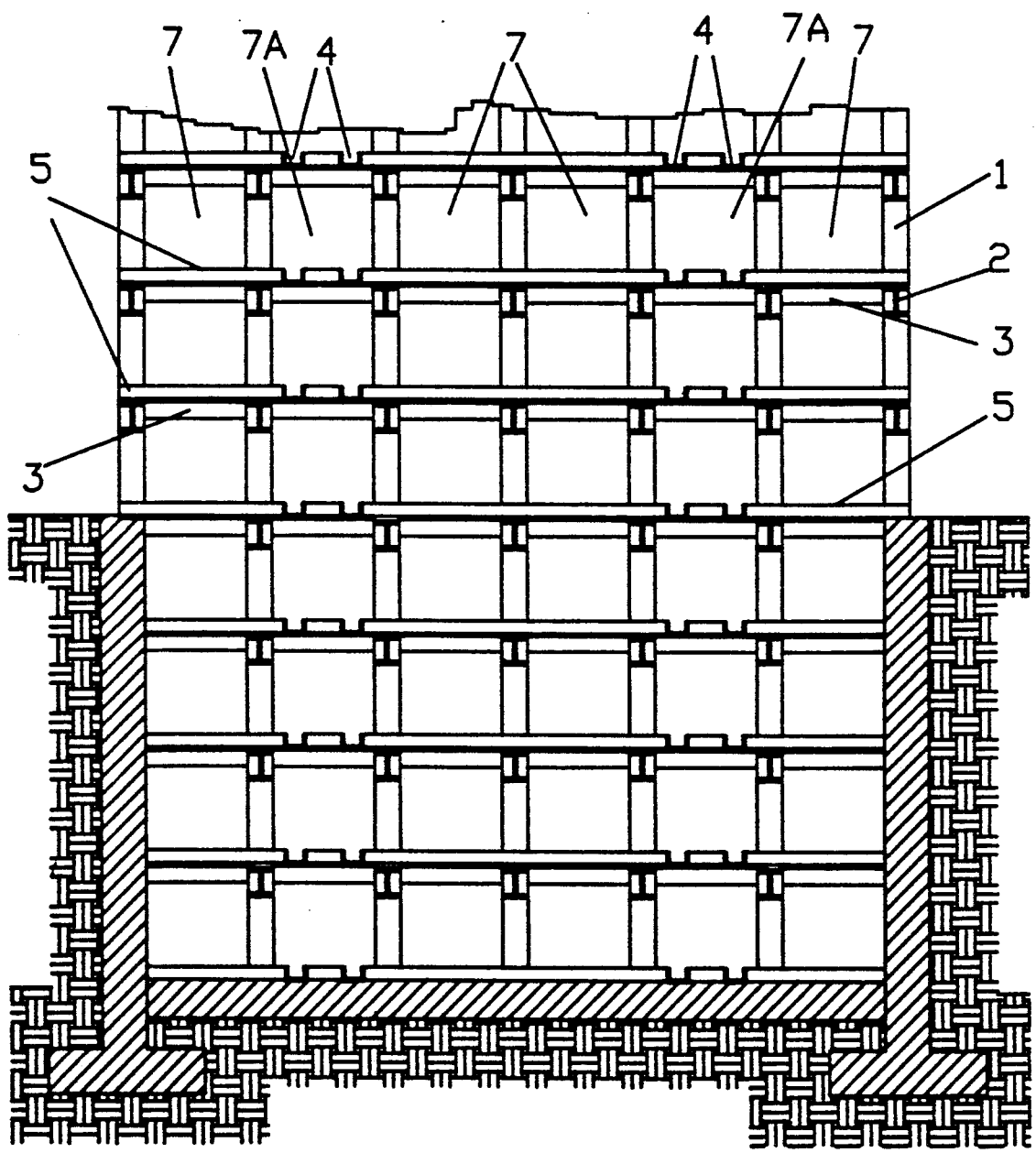
FIG. 2 is a section on the line I—I in FIG. 1 claimed in claim 6 below.
Figure 3:
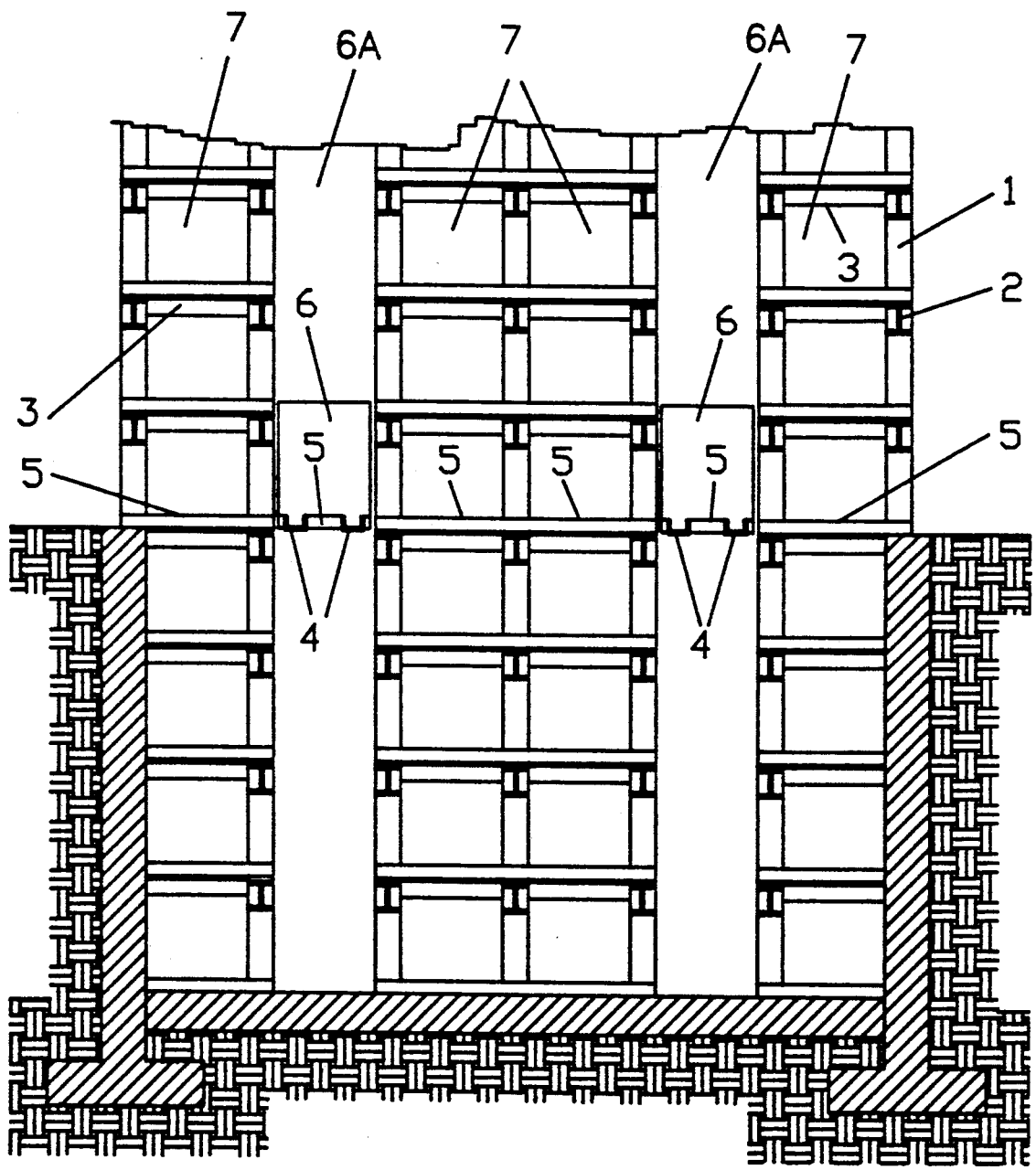
FIG. 3 is a section on the line II—II in FIG. 1 claimed in claim 6 below.
Figure 4:
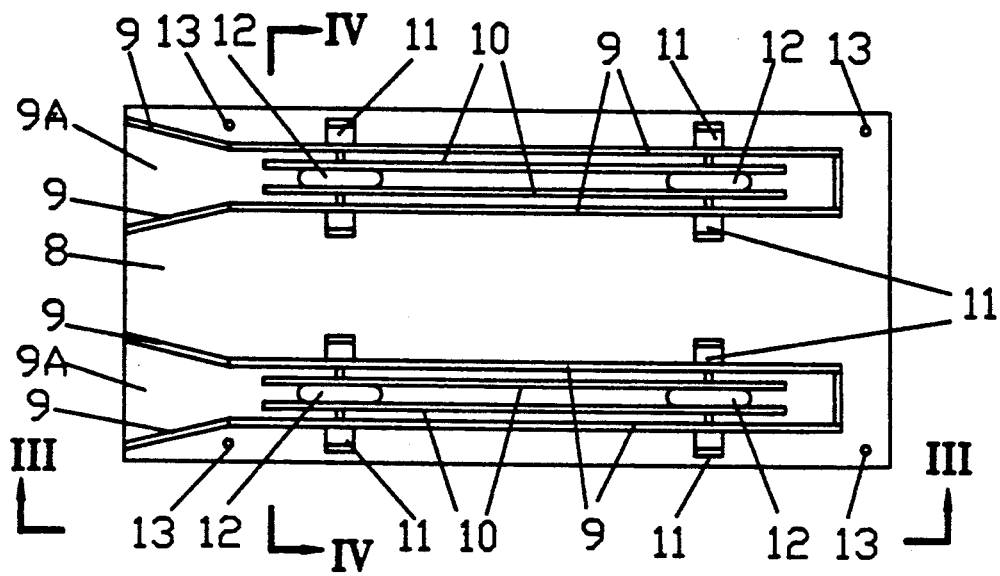
FIG. 4 shows the platform for a parking vehicle claimed in claim 6 below.
Figure 5:
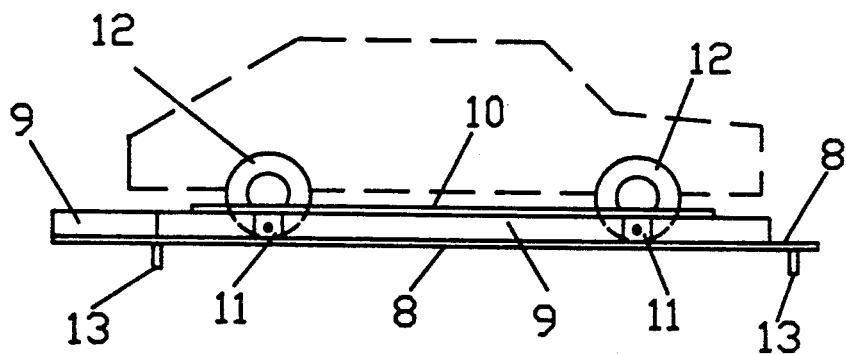
FIG. 5 is a view on the line III—III in FIG. 4 claimed in claim 6 below.
Figure 6:
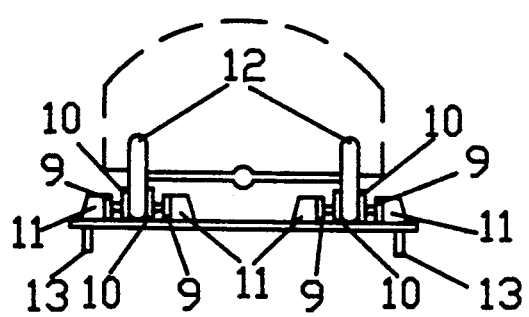
FIG. 6 is a section on the line IV—IV in FIG. 4 claimed in claim 6 below.
Figure 7:
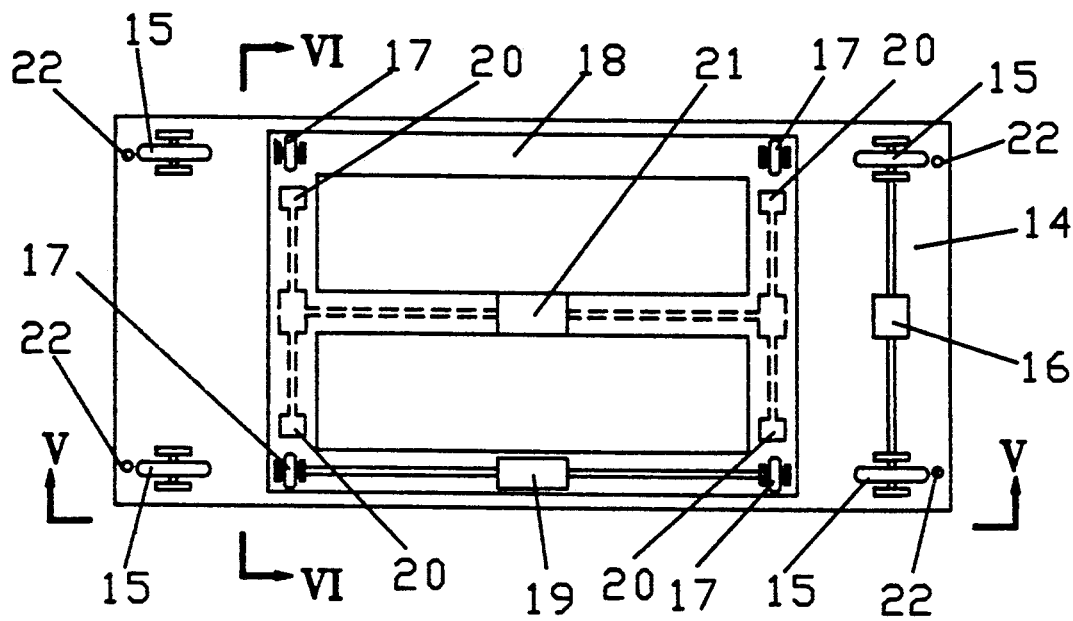
FIG. 7 is a view from under the shuttle claimed in claim 6 below.
Figure 8:
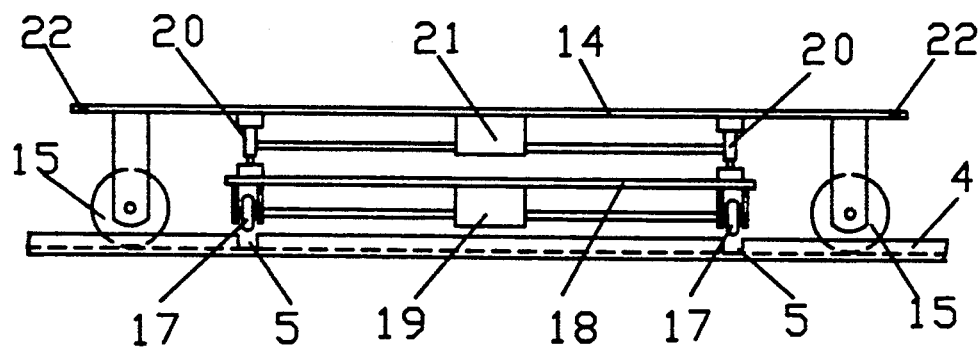
FIG. 8 is a view on the line V—V in FIG. 7 claimed in claim 6 below.
Figure 9:
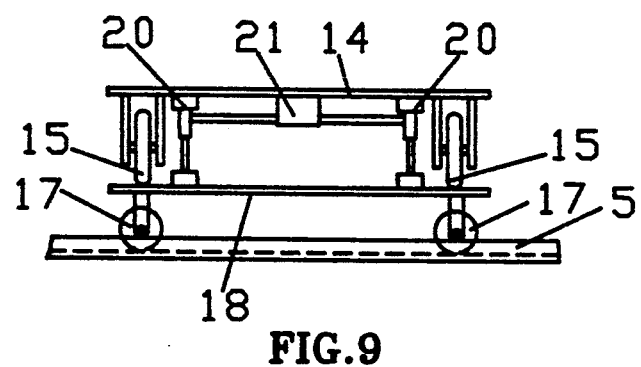
FIG. 9 is a section on the line VI—VI in FIG. 7 claimed in claim 6 below.

An automated multistorey parking as seen in FIGS. 1 to 3 consists of structures: column 1, horizontal longitudinal elements 2, horizontal transverse elements 3, longitudinal guides 4 and transverse guides 5 (e.g. channel-shaped). At intersections of guides 4 and 5, the vertical parts of guides 4 are truncated. The said elements are assembled in such a way that the entire volume of the building is partitioned into boxes 7 (where vehicles are parked), lanes (corridors) 7A where shuttles or trolleys are moving that distribute vehicles into the vacant boxes and elevator pits 6A for vertical vehicle delivery. Floors between boxes 7 are manufactured as grid desk plating (not shown on drawings). Guides 4 and 5 on which shuttles are moving represent also elements of supporting structures of the multistorey parking building and simultaneously serve as a base for installation of the grid deck plating. Vertically, between floors, shuttles or trolleys with vehicles are moved by elevators 6, which also have guides 4 and 5. All guides of each floor are on the same horizontal level. Elevator 6 moving a shuttle or a trolley with a vehicle to certain floor of the parking, stops in such position that his guides 4 and 5 are aligned with guides 4 and 5 of the floor so that shuttle or a trolley with a vehicle can move horizontally in two perpendicular directions.

In every box 7 there is platform 8 with edges bent up in order not to spill dirt on the top of lower vehicle. Vehicle are put on platform at the entrance by driver. The platform 8 (see drawings 4 to 6) has two guide-tracks 9A of enough width to accommodate wheels 12 of different vehicles and track borders 9. One or both tracks 9A have a mechanism fixing wheels of a vehicle on the platform. Inside track borders 9 there are two strips 10 moved in transverse direction by mechanisms 11 (e.g., hydraulic jacks) that fasten wheel 12 in tracks 9A. One, two or all four wheels of a vehicle can be fixed. Platform 8 is fastened on a shuttle 14, e.g., by means of studs (pins) 13.

The shuttle 14 (see drawings 7 to 9) has a plate or frame 14 fitted with wheels 15 with a motor 16. The shuttle 14 has also the bottom frame 18 with transverse wheels 17 and motor 19. The frame 18 is connected with the frame 14 of the shuttle by jacks 20 that change the vertical position of transverse wheels 17. Mechanism 21 brings in motion simultaneously hydraulic jacks 20 for lowering or lifting wheels 17 in order that the shuttle 14 could be transferred from longitudinal motion along guides 4 onto transverse motion along guides 5, and also for putting the platform 8 on special supports in a box 7 (these supports are not shown on FIG. 3 of the box 7). Special holes 22 are for fixing the platform 8 on the shuttle 14.

Figure 10:
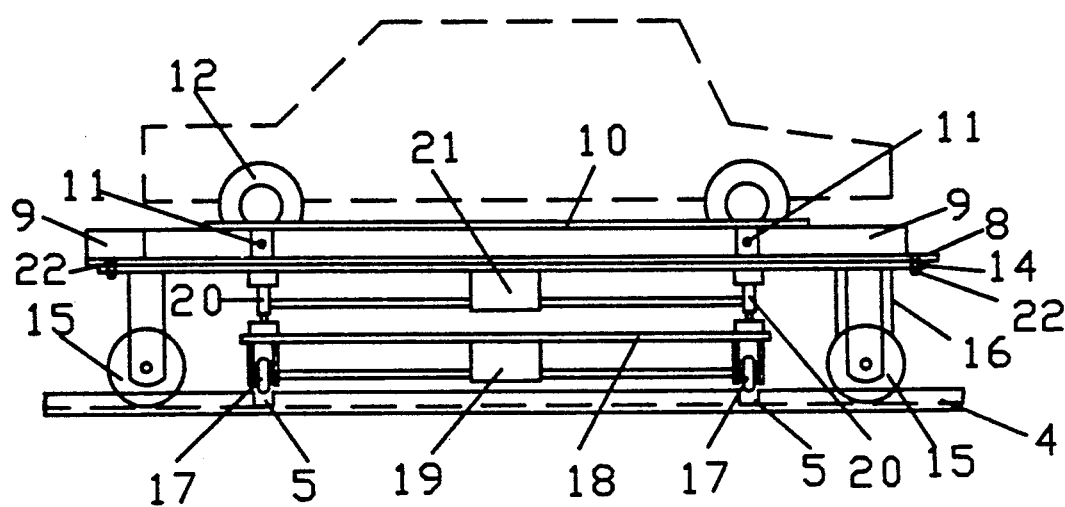
FIG. 10 is a longitudinal view of the shuttle with the platform claimed in claim 6 below.

Shuttle 14 (with platform 8 and a vehicle) in motion along the longitudinal guides 4 is shown in FIG. 10. At a stop near a vacant box 7, the mechanism 21 starts and hydraulic jacks 20 lower wheels 17 into guides 5, simultaneously lifting wheels 15; the shuttle 14 moving along guides 5 enters box 7, leaves on special supports (not shown) the platform 8 with a vehicle and returns to guides 4 for the next operation (next parking or vehicle delivery).

Figure 11:
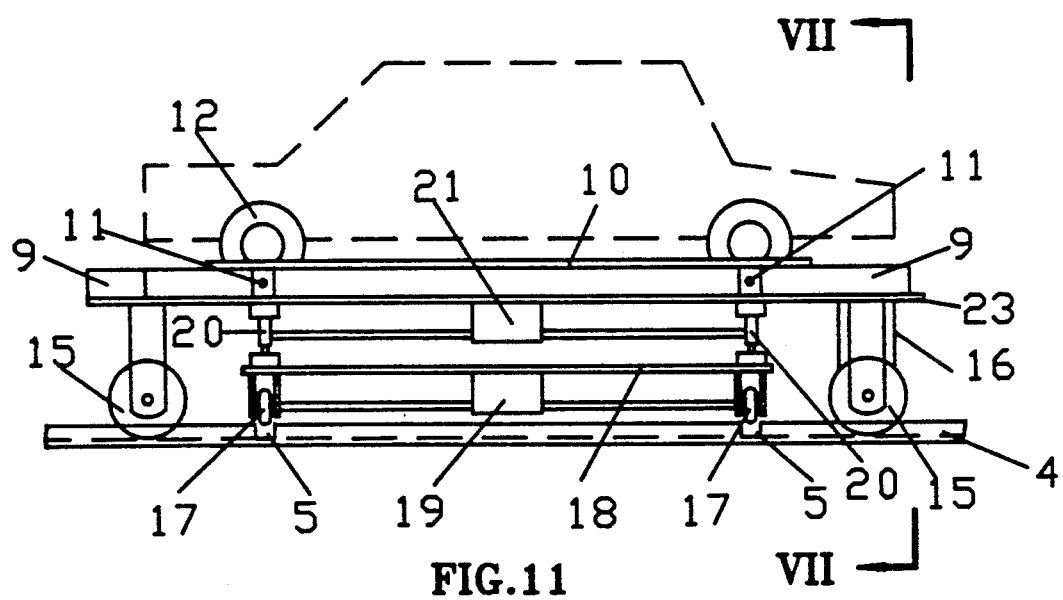
FIG. 11 is a longitudinal view of the trolley claimed in claim 9 below.

In FIG. 11, a version is shown where the platform is fixed permanently to the shuttle to form a trolley 23 which either remaines in a box 7 with a vehicle parked thereon or moves to the exit (entrance) to deliver a car and waits there for a new vehicle. This solution is different from the previous one in that there are no shuttles nor platforms but there are as many trolley 23 as there are boxes 7, and each trolley has a platform as its integral part and is used for parking a vehicle into a parking box.

Figure 12:
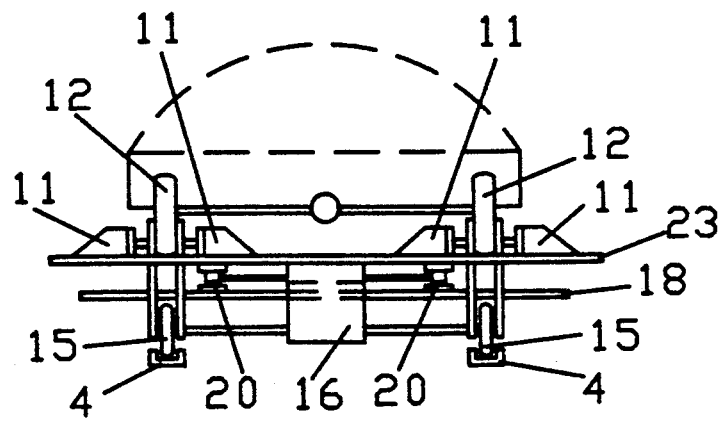
FIG. 12 is a view on the line VII—VII in FIG. 11 claimed in claim 9 below.

In FIG. 12 the transverse view on the VII—VII of a trolley 23 with a vehicle on longitudinal guides 4 is shown (transverse wheels 17 are not shown).

Figure 13:
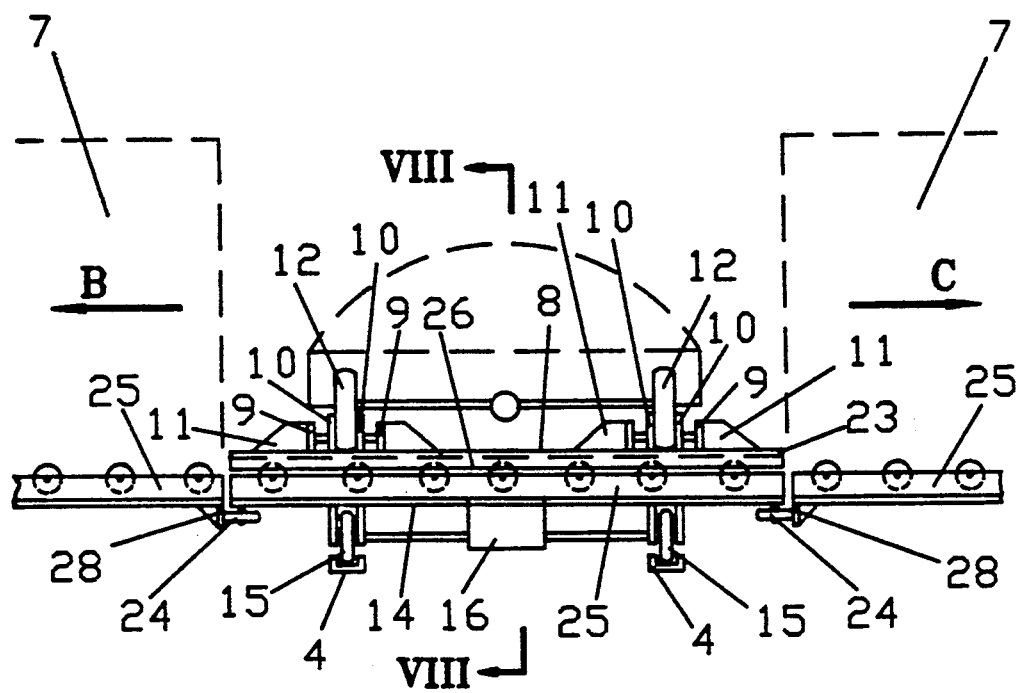
FIG. 13 is a transverse view of the shuttle and the platform with roller conveyer for moving the platform to lateral directions claimed in claim 7 and 8 below.
Figure 14:
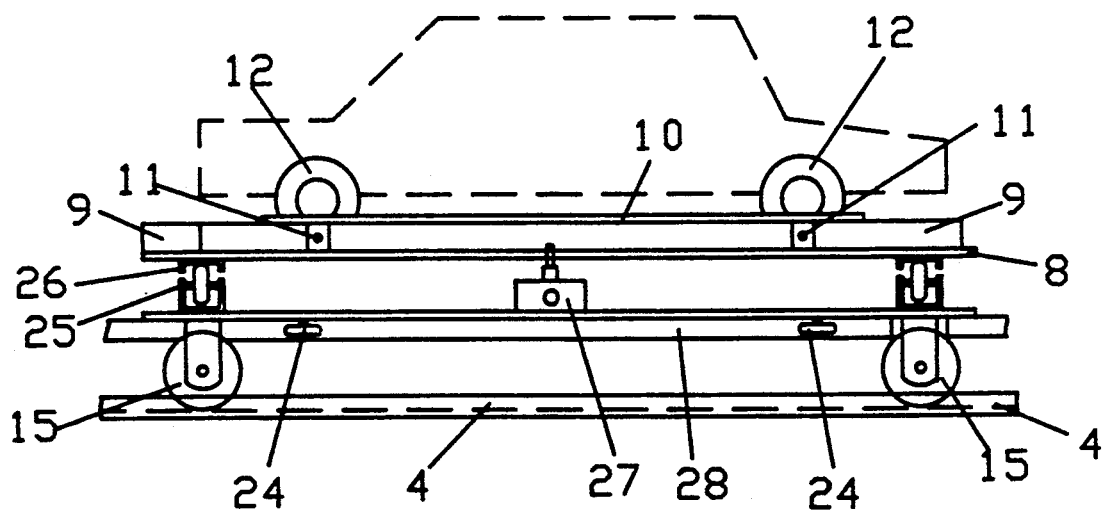
FIG. 14 is a section on the line VIII—VIII in FIG. 13 claim in claim 7 and 8 below.

As a possible version, in FIGS. 13 and 14, a shuttle 14 is shown fitted with longitudinal wheels 15 only. For moving platform 8 in the transverse direction (arrow B or C), shuttles 14 and boxes 7 are fitted with roller conveyers 25, and platform 8 has guides 26. The platform 8 is moved in and out of boxes 7 by the mechanism 27, e.g., hydraulic telescopic shaft. In order to decrease the swinging of shuttle 14 in speedy motion and when mechanism 27 is working, the shuttle 14 is fitted with rollers 24 and lanes (corridors) 7A are fitted with guide strips 28.

Control equipment is not shown on drawings. The parking process is computer-controlled. There is no personnel in the parking building and no driver can enter the parking which ensures absolute security for the parked vehicles and their contents. In case of a failure, the alarm system calls a technician on duty for inspection and repairs. The parking building is fitted with ventilation and fire prevention systems.

The embodiments of the invention in which an exclusive property or privilege is claimed are defined as follows:

1. A multistory parking apparatus comprising: A multistory parking building consisting of columns, longitudinal and transverse elements for partitioning of the building into boxes for parking vehicles, lanes for horizontal vehicle distribution, and elevator pits; longitudinal guides in each lane and transverse guides in each box, said longitudinal guides being perpendicular to said transverse guides; elevators located in said elevator pits and having longitudinal and transverse guides which align, respectively, with said longitudinal guides of each lane and said transverse guides of each box at appropriate levels; a platform located in each box, said platform having at least one guide track for vehicle wheels and two wheel fixing means located in said at least one guide track for preventing movement of vehicle wheels; and shuttle means for moving said platforms, said shuttle means comprising: two frames one of which is fitted with longitudinal wheel means for moving said shuttle in said longitudinal guides of each lane and another of which is fitted with transverse wheel means for moving said shuttle in said transverse guides of each box, said frames being joined by jack means for lowering said transverse wheel means into engagement with said transverse guides and thus raising said longitudinal wheel means out of engagement with said longitudinal guides or raising said transverse wheel means out of engagment with said transverse guides thus lowering said longitudinal wheel means into engagement with said longitudinal guides thus enabling said shuttle means to travel along said transverse or said longitudinal guides.

* * * * *